(12) United States Patent
Terasaka

(10) Patent No.: US 6,236,462 B1
(45) Date of Patent: May 22, 2001

(54) COMPUTER SYSTEM, HOST COMPUTER AND TERMINAL EQUIPMENT

(75) Inventor: Susumu Terasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/164,570

(22) Filed: Oct. 1, 1998

(30) Foreign Application Priority Data

Oct. 29, 1997 (JP) .................................................. 9-296910

(51) Int. Cl.⁷ .................................................. G06K 15/00
(52) U.S. Cl. .............................. 358/1.13; 358/1.12; 712/1
(58) Field of Search ................................. 358/1.13, 1.14, 358/1.15, 1.18, 11.3; 400/61; 712/1; 395/700, 111; 382/274

(56) References Cited

U.S. PATENT DOCUMENTS 6,029,238 * 2/2000 Furukawa .................................. 712/1

\* cited by examiner

*Primary Examiner*—Jeffrey Gaffin
*Assistant Examiner*—Thanh Y. Tran
(74) *Attorney, Agent, or Firm*—Staas & Halsey LLP

(57) ABSTRACT

In a computer system, results of printing to be produced at a terminal side are predicted at a host computer side, and print settings at the terminal side can be changed from the host computer, which has a preview processing section emulating the operations system of the terminal equipment, to enable the printer driver loaded from the terminal equipment to be run on the host computer and thereby to create a preview of material to be printed at the terminal equipment. A desired print preview is obtained by manually changing the print settings, at the time of the desired print preview, and which are stored. A printing processing section queries the terminal equipment regarding the print settings and, if the print settings obtained as the result of the querying are not appropriate, selects appropriate print settings from among the print settings stored in the print setting storing section and thereafter sends a print request to the terminal equipment.

17 Claims, 9 Drawing Sheets

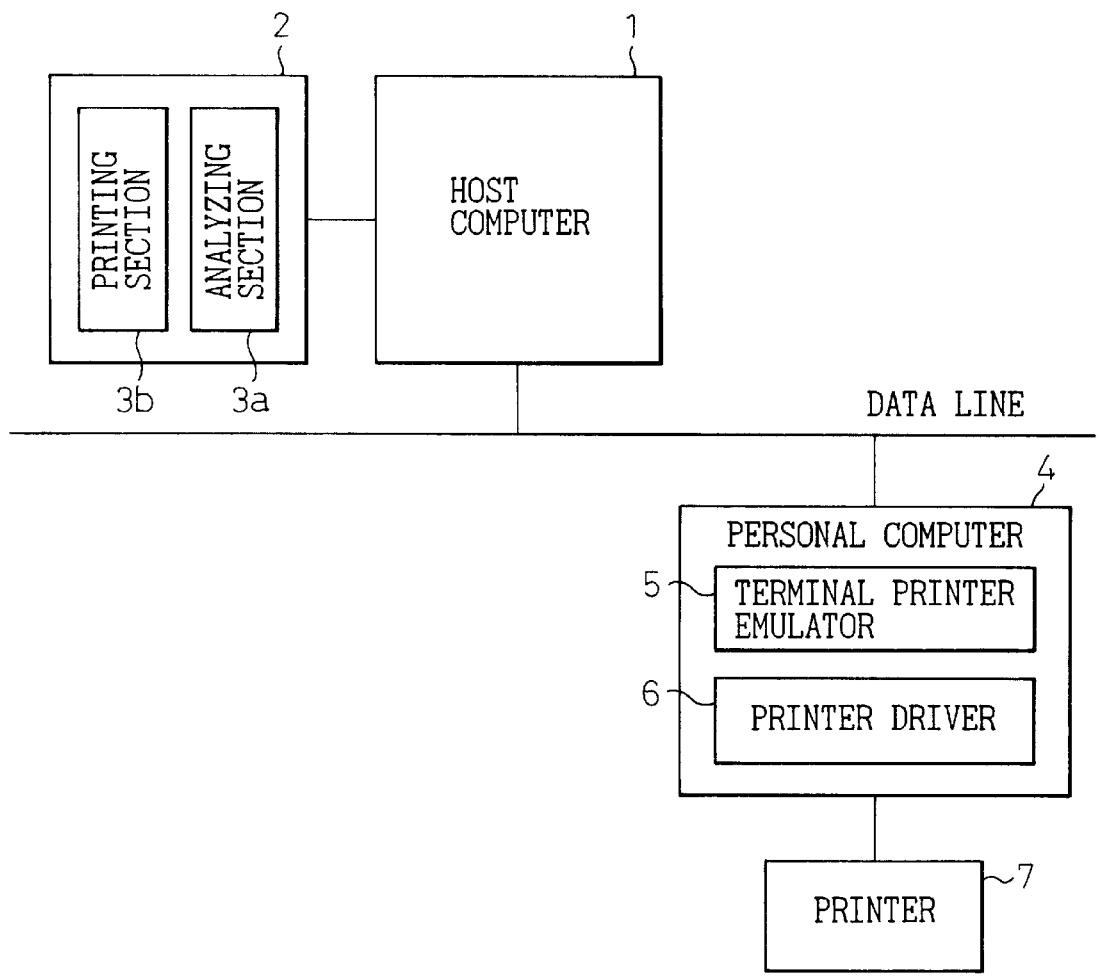

COMPUTER SYSTEM, HOST COMPUTER AND TERMINAL EQUIPMENT

BACKGROUND OF THE INVENTION

1. Field of the Invention

The present invention relates to a computer system wherein a print preview of printed material that a terminal will produce, in accordance with form data supplied from a host computer, is created at the host computer and the print settings at the time the desired preview is obtained are downloaded to the terminal equipment.

2. Description of the Related Art

FIG. 9 is a diagram showing an example of a network system. In the figure, reference numeral 1 is a host computer, 2 is a printer dedicated to the host, 3a is an analyzing section, 3b is a printing section, 4 is a terminal (a personal computer, a workstation, or the like), 5 is a host terminal printer emulator, 6 is a printer driver, and 7 is a printer.

The host computer 1 has its dedicated printer 2. The dedicated printer 2 includes the analyzing section 3a and the printing section 3b. The analyzing section 3a analyzes the form data transferred from the host computer 1, creates print data (e.g., a sequence of character codes and control codes) representing the material to be printed, and passes the created print data to the printing section 3b. The printing section 3b performs printing in accordance with the supplied print data.

The terminal 4 and the host computer 1 are connected via a data line. The terminal 4 is a personal computer, a workstation, or the like, and contains therein the host terminal printer emulator 5 and the printer driver 6. The host terminal printer emulator 5 is one that replaces the functions of the host terminal printer 2, hardware dedicated to the host, with software that runs on the personal computer or workstation, and thus enables the digital data from the host computer to be printed using the ordinary office printer 7. More specifically, when the form data sent from the host computer 1 is received, the host terminal printer emulator 5 creates the print data by analyzing the form data, and passes the created print data to the printer driver 6. The printer driver 6 converts the print data into a form that the printer 7 can understand, and passes the thus converted print data to the printer 7.

In the prior art, at the host computer, there is no knowing what print settings the host terminal printer emulator and the printer driver have; hence, it has not been possible at the host computer to accurately predict the results of the printing produced at the terminal. Furthermore, the kinds of print settings that the host computer can specify to the host terminal printer emulator and the printer driver are extremely limited in number, so that the host computer cannot set all the print parameters that can be changed at the host terminal printer emulator side.

SUMMARY OF THE INVENTION

The present invention has been devised in view of the above situation, and an object of the invention is to provide a computer system wherein provisions are made so that the results of the printing to be produced at the terminal side can be accurately predicted at the host computer side, and so that the print settings of each individual host terminal printer emulator and printer driver can be made from the host computer.

To achieve the above object, according to the present invention, there is provided a computer system comprising: (a) terminal equipment having a host terminal printer emulator and a printer driver; (b) a host computer including (1) a printing processing section for carrying out processing to cause the terminal equipment to perform printing, (2) a preview processing section for emulating an operating system running at the host terminal printer emulator side, and thereby enabling the printer driver to be run on the host computer, loading the printer driver from the host terminal printer emulator side, and creating a print preview of material to be printed at the terminal equipment side, and (3) a print setting storing section; and (c) a communication line connecting the host computer and the terminal equipment.

Preferably, the preview processing section queries the host terminal printer emulator about an identifier identifying the printer driver currently being used, examines whether the printer driver is already loaded, and loads the printer driver from the terminal equipment if the printer driver is not loaded yet.

Preferably, the print setting storing section stores print settings at the time a desired print preview is obtained.

Preferably, the print setting storing section stores a plurality of host terminal printer emulator and/or printer driver print settings, and the printing processing section selects print settings from among the print settings stored in the print setting storing section and downloads the selected print settings to the host terminal printer emulator.

Preferably, the preview creating section emulates a plurality of host terminal printer emulator operating systems, the print setting storing section holds therein a plurality of host terminal printer emulator and/or printer driver print settings, and the printing processing section queries the host terminal printer emulator about the print settings of the host terminal printer emulator and/or the printer driver and, if the print settings obtained as the result of the querying are not appropriate, selects print settings from among the print settings stored in the print setting storing section and downloads the selected print settings to the host terminal printer emulator.

Preferably, print settings for the host terminal printer emulator and/or the printer driver are included in form data to be sent from the host computer to the host terminal printer emulator.

The effect of the present invention will be described. The preview processing section emulates the operating system of the terminal equipment, and thus enables the printer driver of the terminal equipment to be run on the host computer. Then, the printer driver of the terminal equipment is loaded, and a print preview displaying the same image as will be printed at the terminal side is created. If the print preview is not what is expected, the print settings are changed to obtain the desired print preview, and the print settings at that time are stored in the print setting storing section. The printing processing section queries the terminal equipment about its print settings and, if the print settings obtained as the result of the querying are not appropriate, selects appropriate print settings from among the print settings stored in the print setting storing section and downloads the selected print settings to the host terminal printer emulator before sending a print request to the terminal equipment.

BRIEF DESCRIPTION OF THE DRAWINGS

Further features and advantages of the present invention will be apparent from the following description with reference to the accompanying drawings, in which:

FIG. 9 is a diagram showing an example of a network.

DESCRIPTION OF THE PREFERRED EMBODIMENTS

Figure 1:
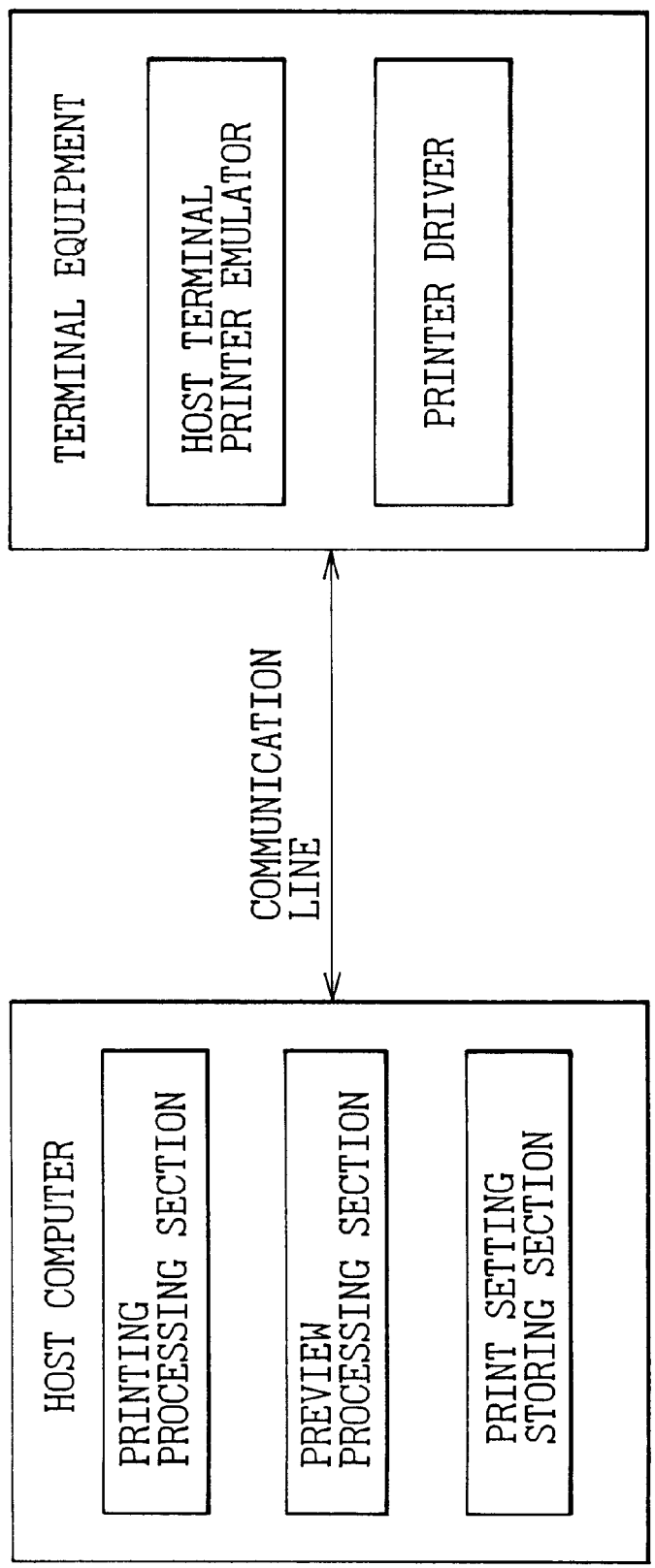
FIG. 1 is a diagram for explaining the operating principle of the present invention.

FIG. 1 is a diagram for explaining the operating principle of the present invention. The computer system according to the present invention comprises: terminal equipment having a host terminal printer emulator and a printer driver; a host computer having a printing processing section for carrying out processing to cause the terminal equipment to perform printing, a preview processing section, and a print setting storing section; and a communication line connecting the host computer and the terminal. The preview processing section enables the print driver to be run on the host computer by emulating the operating system running at the host terminal printer emulator side, loads the printer driver from the host terminal printer emulator side, and creates a print preview of material to be printed at the host terminal printer emulator side.

Figure 2:
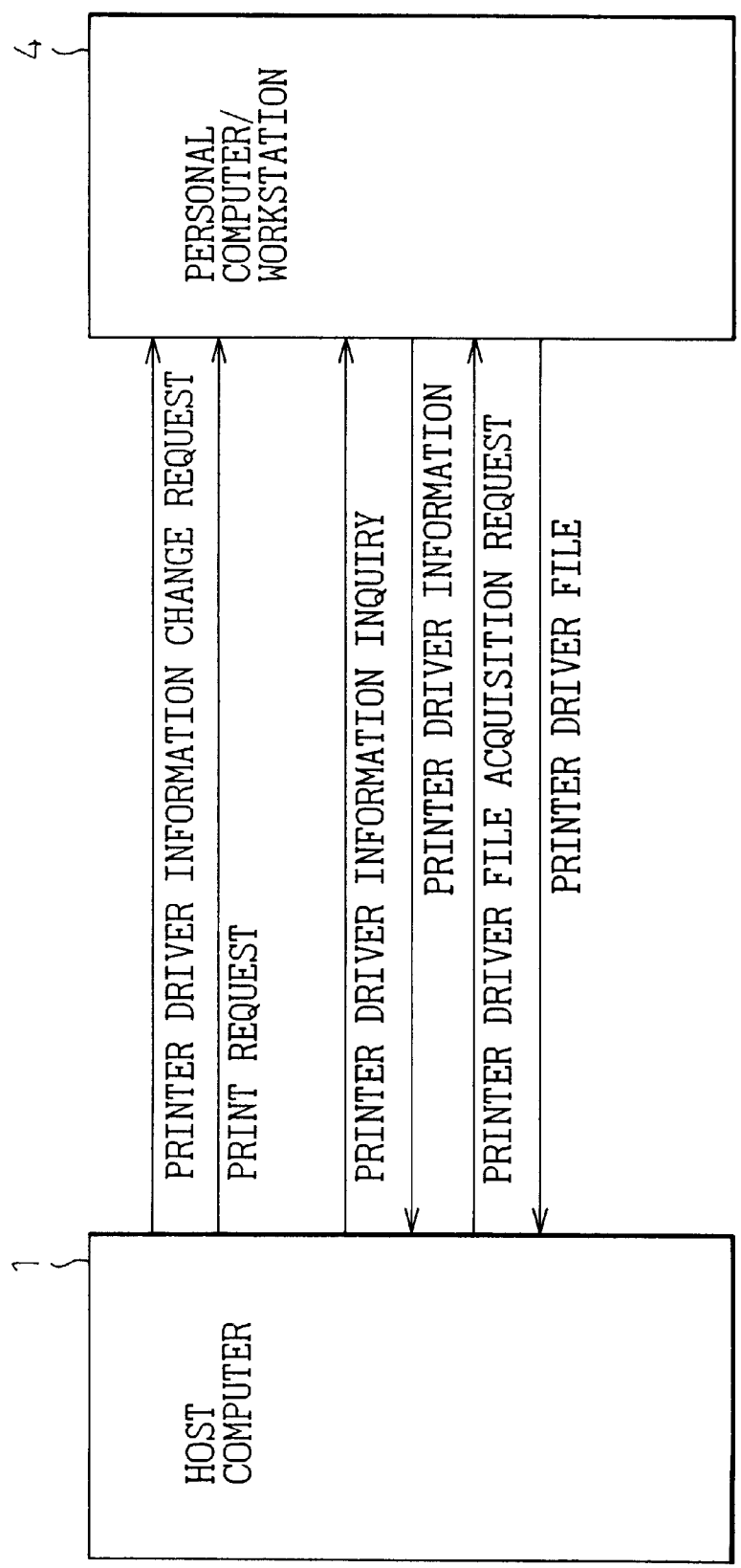
FIG. 2 is a diagram for explaining information transfers between a host and a terminal.

FIG. 2 is a diagram for explaining information transfers between the host and the terminal. When a printer driver information change request issued from the host computer 1 is received, the terminal 4 changes the current print settings of the terminal printer emulator and the printer driver. When a print request issued from the host computer 1 is received, the terminal 4 performs printing.

When a printer driver information inquiry issued from the host computer is received, the terminal 4 sends to the host computer 1 the print settings that the host terminal printer emulator and the printer driver have. When a printer driver file acquisition request issued from the host computer 1 is received, the terminal 4 uploads the printer driver file to the host computer 1.

Figure 3:
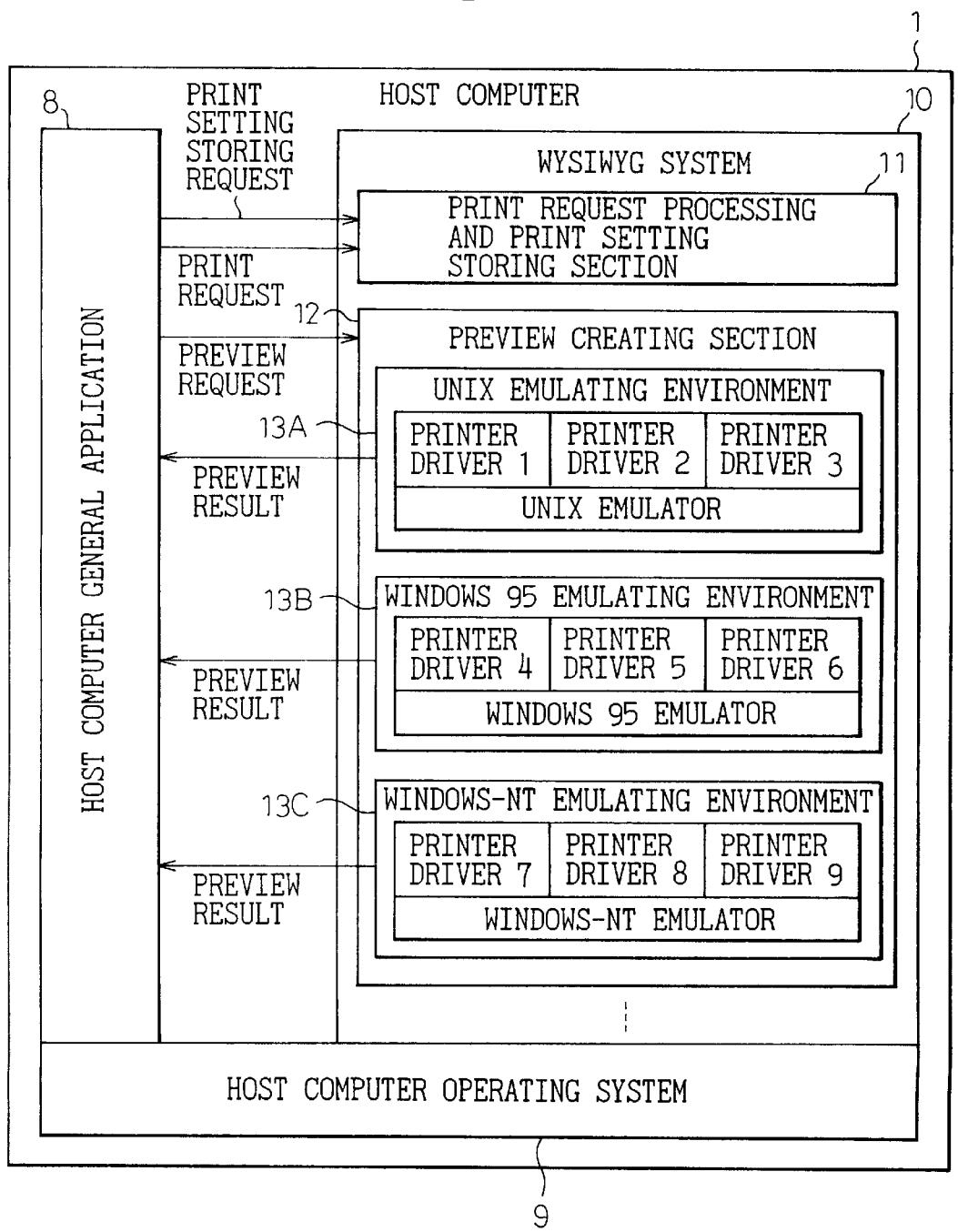
FIG. 3 is a diagram showing an example of a software configuration in the host computer.

FIG. 3 is a diagram showing an example of a software configuration in the host computer. In the figure, reference numeral 8 is the host computer's general application, 9 is the host computer's operating system, 10 is a WYSIWYG system, 11 is a print request processing and print setting storing section, 12 is a preview creating section, 13A is a UNIX emulating environment, 13B is a Windows 95 emulating environment, and 13C is a Windows-NT emulating environment.

The software programs are loaded from various kinds of recording media into a main memory (not shown) inside the host computer and then executed within the main memory.

The host computer 1 contains the general application 8, the host operating system 9, and the WYSIWYG system 10. WYSIWYG is an acronym for What You See Is What You Get, which means that the image that the user sees on the display screen is the same as what he will see when it is printed.

The WYSIWYG system 10 includes the print request processing and print setting storing section 11. When a print setting storing request is issued from the general application 8, the print request processing and print setting storing section 11 stores the print settings appended to the request. When a print request is issued from the general application 8, the print request processing and print setting storing section 11 sends the print request to the terminal 4.

The WYSIWYG system 10 further includes the preview creating section 12. The preview creating section 12 includes the UNIX emulating environment 13A, the Windows 95 emulating environment 13B, and the Windows-NT emulating environment 13C.

The UNIX emulating environment 13A emulates host terminal printer emulators and printer drivers operating on the UNIX OS, and includes a UNIX emulator, a host terminal printer emulator (not shown), and printer drivers 1 to 3.

The Windows 95 emulating environment 13B emulates host terminal printer emulators and printer drivers operating on the Windows 95 OS, and includes a Windows 95 emulator, a host terminal printer emulator (not shown), and printer drivers 4 to 6.

The Windows-NT emulating environment 13C emulates host terminal printer emulators and printer drivers operating on the Windows-NT OS, and includes a Windows-NT emulator, a host terminal printer emulator (not shown), and printer drivers 7 to 9.

When a preview request is issued from the general application 8, the preview creating section 12 creates a print preview of form data by using the emulating environment corresponding to the terminal specified by the preview request, and returns the created print preview to the general application 8. The general application 8 displays the received print preview on the display screen.

An explanation will be given of how the print preview is created, for example, in the UNIX emulating environment.

(1) In the host computer, the WYSIWYG system receives a preview request from the host computer general application.

(2) From the contents of the preview request, the WYSIWYG system judges that the preview must be presented in the UNIX emulating environment.

(3) The WYSIWYG system checks to determine whether the printer driver necessary for the preview is already installed on the UNIX emulating environment. If it is installed, the process proceeds directly to (6) bypassing (4) and (5), below; otherwise, the process proceeds to (4).

(4) The WYSIWYG system in the host computer communicates with the host terminal printer emulator in the UNIX workstation where actual printing is to be done, and the necessary printer driver is uploaded from the workstation to the host computer.

(5) The WYSIWYG system installs the uploaded printer driver on the UNIX emulating environment.

(6) The print preview is created using the installed printer driver.

Figure 4:
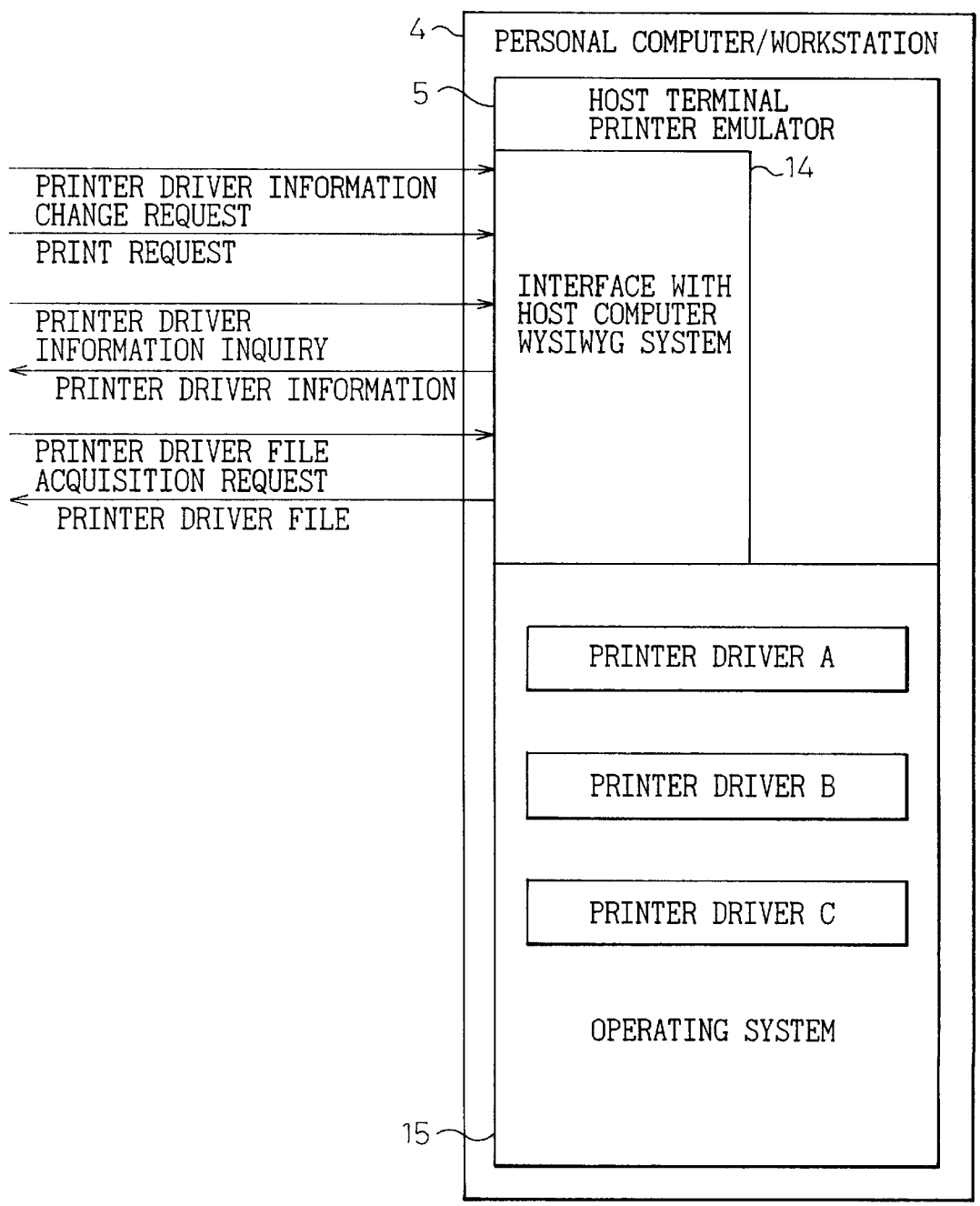
FIG. 4 is a diagram showing an example of a software configuration in the terminal.

FIG. 4 is a diagram showing an example of a software configuration in the terminal. In the figure, reference numeral 14 is an interface section, 15 is an operating system, and A to C are printer drivers.

The software programs are loaded from various kinds of recording media into a main memory (not shown) inside the terminal and then executed within the main memory.

The terminal 4 contains the host terminal printer emulator 5 and the operating system 15. The host terminal printer emulator 5 includes the interface section 14. The interface section 14 is responsible for communications between the host terminal printer emulator 5 and the WYSIWYG system in the host computer. The printer drivers A to C are part of the operating system 15.

The printer drivers contain print setting information, for example, as listed below.

PAPER SIZE:
A4, B4, 10 in.×11 in., etc. (including information on width, height, top/bottom/left/right margins, etc.)
PRINT ORIENTATION:
Portrait, Landscape
PAPER FEED METHOD:
Paper cassette 1, Paper cassette 2, Manual feed, Automatic switching, etc.
NUMBER OF COPIES TO BE PRINTED:
RESOLUTION: 240 dpi, 300 dpi, 400 dpi, 600 dpi, etc.
DOUBLE-SIDED PRINTING:
On, Off
COLOR PRINTING:
On, Off
LEFT/RIGHT REVERSED PRINTING:
On, Off
BLACK/WHITE REVERSED PRINTING:
On, off
ORDER OF OUTPUT:
Prints a document beginning with the first page or the last page
FONTS:
Device fonts (printer fonts) or soft fonts (downloaded fonts)
HALFTONE COLOR:
Contrast, Brightness, RGB gamma, etc.
PRINT QUALITY:
Smoothing (ON/OFF)
ENLARGE/REDUCE:
TEXT DATA PROCESSING:
Character code or graphics The host terminal printer emulator contains print setting information, for example, as listed below.

ALPHANUMERIC AND KANA CONVERSION:
EBCDIC-US, EBCDIC-ASCII, EBCDIC JAPAN, etc.
CHARACTER SPACING:
CPI
LINE SPACING:
LPI
MAXIMUM LINE LENGTH:
Number of characters
PAGE LENGTH:
Number of lines
TOP MARGIN:
LEFT MARGIN:
NUMBER OF LINES TO BE FED AT AUTOMATIC LINE FEED:
NUMBER OF LINES TO BE FED AT AUTOMATIC CARRIAGE RETURN:
EFFECTIVE POSITION OF PAGE BREAK COMMAND:
At beginning of line or at any position
PRINTING OF BLANK CHARACTERS AFTER PAGE BREAK COMMAND:
On, Off
PRINTING OF UNDEFINED KANJI CODE:
Not displayed or displayed
DELETION OF BLANK LINES
On, Off
OCR-B FONT:
Valid or invalid
FONT TYPE:
FONT SIZE:
SPOOL TIMER VALUE:
NUMBER OF PAGES PER SPOOL UNIT:

The print setting information of the host terminal printer emulator is passed from the WYSIWYG system to the host terminal printer emulator at the terminal side. Information specifying the print format is also appended to the form data, but this format information is the same as the print setting information that the host terminal printer emulator has. However, if there is any format information not carried in the form data supplied from the host computer, the format information is supplemented by the print setting information that the host terminal printer emulator has.

Figure 5:
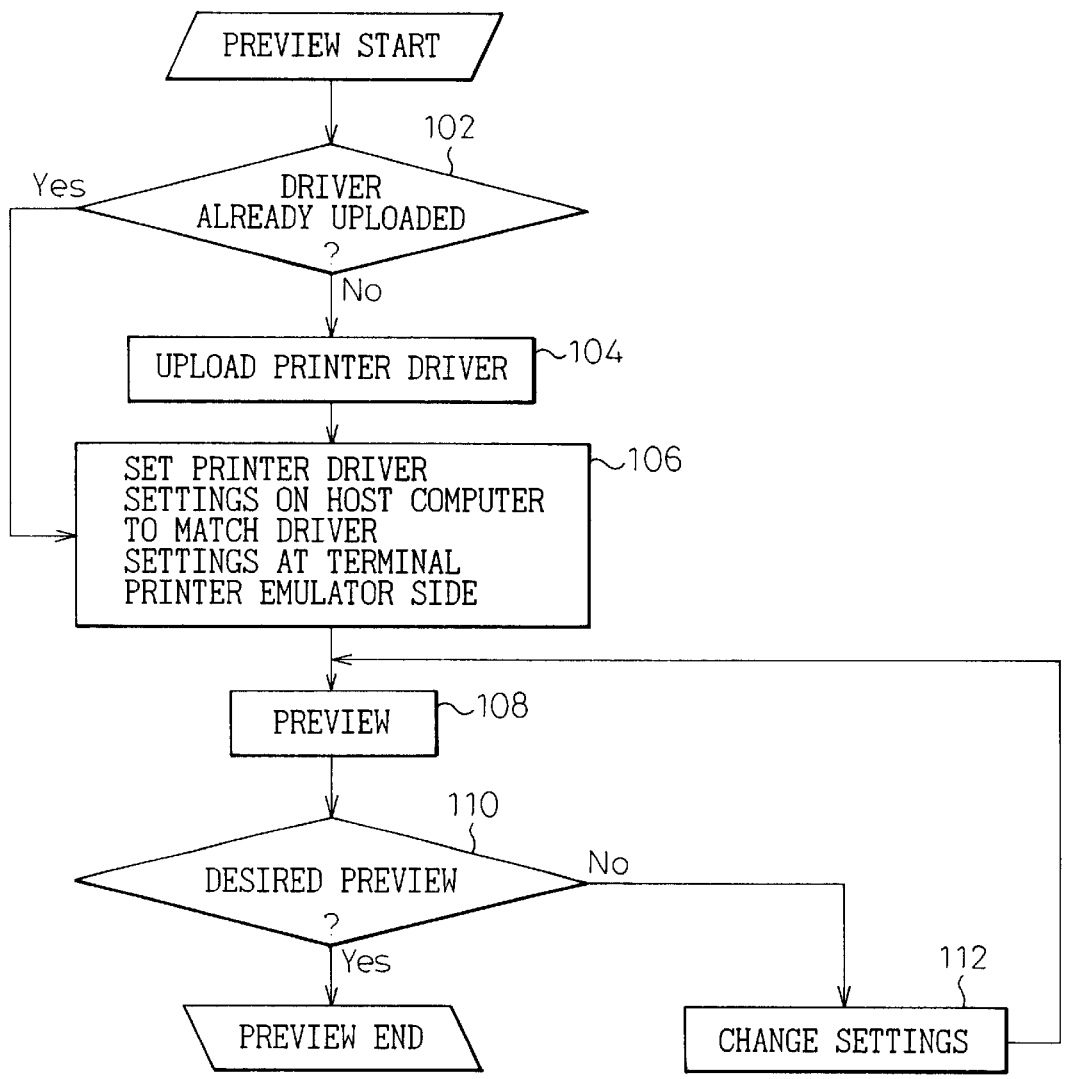
FIG. 5 is a diagram showing an example of a preview processing flow.

FIG. 5 is a diagram for explaining a preview processing flow. Prior to the processing of step 102, the following processing is performed. When the preview request from the general application is received, the WYSIWYG system sends a printer driver information inquiry to the host terminal printer emulator (referred to as TMi) at the terminal specified by the preview request. Upon receiving the printer driver information inquiry, the host terminal printer emulator TMi at the terminal sends the printer driver information to the WYSIWYG system. The printer driver information includes the printer driver name, driver version information, and print setting information. The print setting information includes the print settings of the printer driver as well as the print settings of the terminal printer emulator. For simplicity, it is assumed here that the host terminal printer emulator TMi at the terminal side is running under the UNIX OS.

In step 102, the WYSIWYG system checks to see if the printer driver (referred to as PDj) specified by the received printer driver information is contained in the emulating environment (the UNIX emulating environment) corresponding to the host terminal printer emulator at the terminal to which inquiry was sent; if the answer is YES, the process proceeds to step 106, but if the answer is NO, the process proceeds to step 104.

In step 104, the WYSIWYG system sends a printer driver file acquisition request to the host terminal printer emulator TMi at the terminal. Upon receiving the printer driver file acquisition request, the host terminal printer emulator TMi at the terminal sends the printer driver file it is using to the WYSIWYG system.

In step 106, the WYSIWYG system sets the print settings of the printer driver PDj contained in the UNIX emulating environment to match the printer settings of the printer driver PDj at the terminal, and likewise, sets the print settings of the host terminal printer emulator TMi contained in the UNIX emulating environment to match the print settings of the host terminal printer emulator at the terminal.

In step 108, the WYSIWYG system processes the form data appended to the preview request in the UNIX environment, and returns the resulting print preview to the general application that originated the request.

In step 110, the operator of the host computer checks the print preview to determine whether it matches the desired printing result. If it does, the operator performs an operation to store the current print settings in the print setting storing section, and ends the preview process; otherwise, the process proceeds to step 112.

In step 112, the operator performs an operation to modify the print settings of the print driver PDj and/or the print settings of the host terminal printer emulator TMi contained in the WYSIWYG system. The process then returns to step 108 where the preview is created using the modified print settings.

Figure 6:
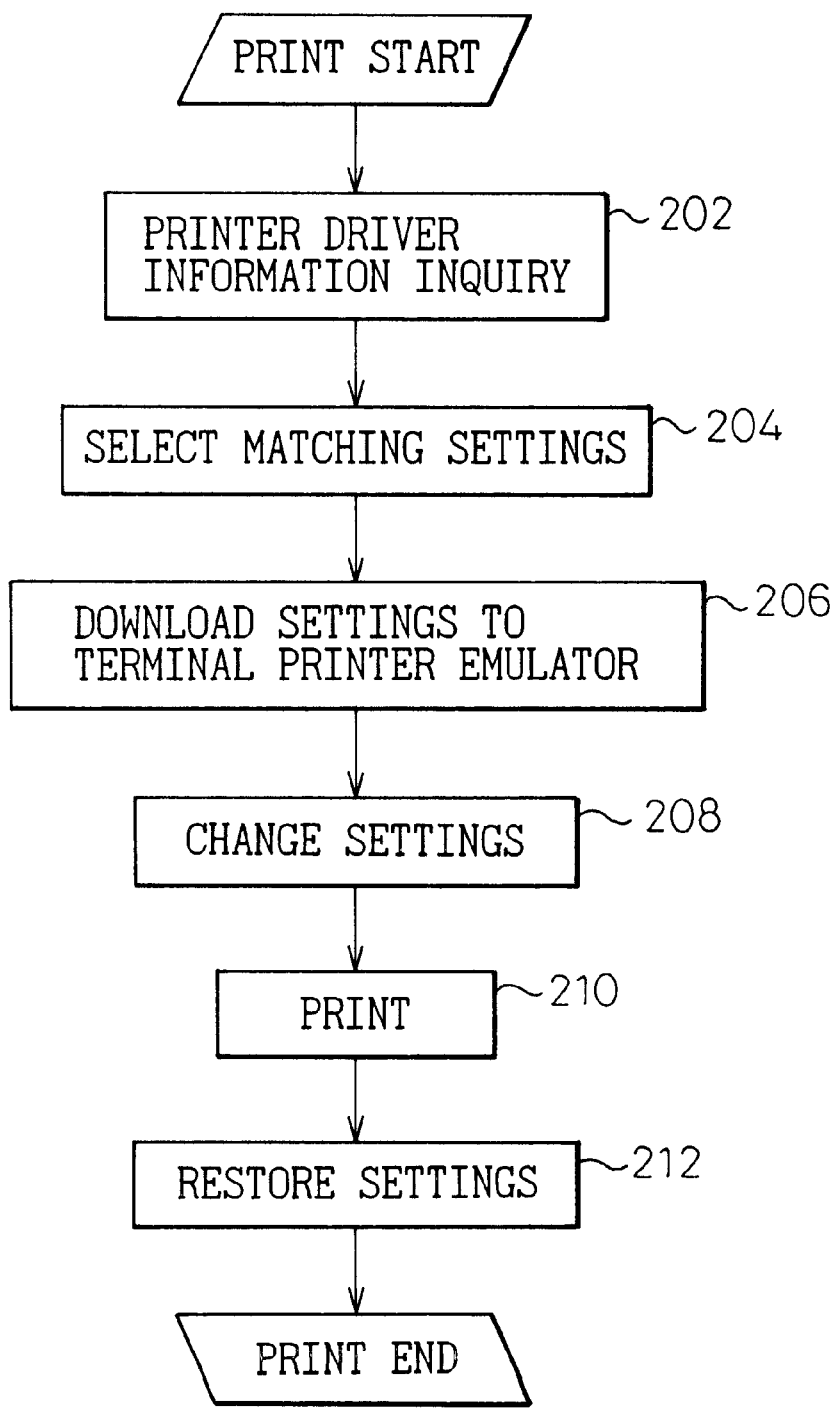
FIG. 6 is a diagram showing an example of a printing processing flow.

FIG. 6 is a diagram for explaining a printing processing flow. The print request processing and print setting storing section in the WYSIWYG system has a terminal configuration table and one print setting table for each terminal. The terminal configuration table contains the name of the OS, the name of the host terminal printer emulator, and the name of the printer driver for each terminal. Each print setting table contains the optimum print settings for each kind of form.

In step 202, the WYSIWYG system sends a printer driver information inquiry to the host terminal printer emulator TMi at the terminal. Upon receiving the inquiry, the host terminal printer emulator TMi at the terminal returns the printer driver information.

In step 204, the WYSIWYG system examines the returned printer driver information to determine if it matches the form data about to be sent out. If it does not match, the WYSIWYG system selects the print settings that match the form data.

In step 206, the WYSIWYG system sends a printer driver information change request, with the selected print settings appended to it, to the host terminal printer emulator TMi at the terminal.

In step 208, the host terminal printer emulator TMi at the terminal, upon receiving the printer driver information change request, changes the print settings of its own and/or the print settings of the printer driver it is using.

In step 210, the WYSIWYG system sends a print request, with the form data appended to it, to the host terminal printer emulator TMi at the terminal. Upon receiving the print request, the host terminal printer emulator TMi at the terminal performs printing.

In step 212, the WYSIWYG system sends a printer driver information change request to the host terminal printer emulator TMi at the terminal to restore the print settings of the host terminal printer emulator TMi at the terminal and the print settings of the printer driver of the host terminal printer emulator TMi. Upon receiving the printer driver information change request, the host terminal printer emulator TMi at the terminal restores the print settings of its own and/or the print settings of the printer driver it is using to the original settings.

In FIG. 6, the print settings and the print request are separately sent to the terminal, but alternatively, the print settings may be included in the form data appended to the print request.

Figure 7:
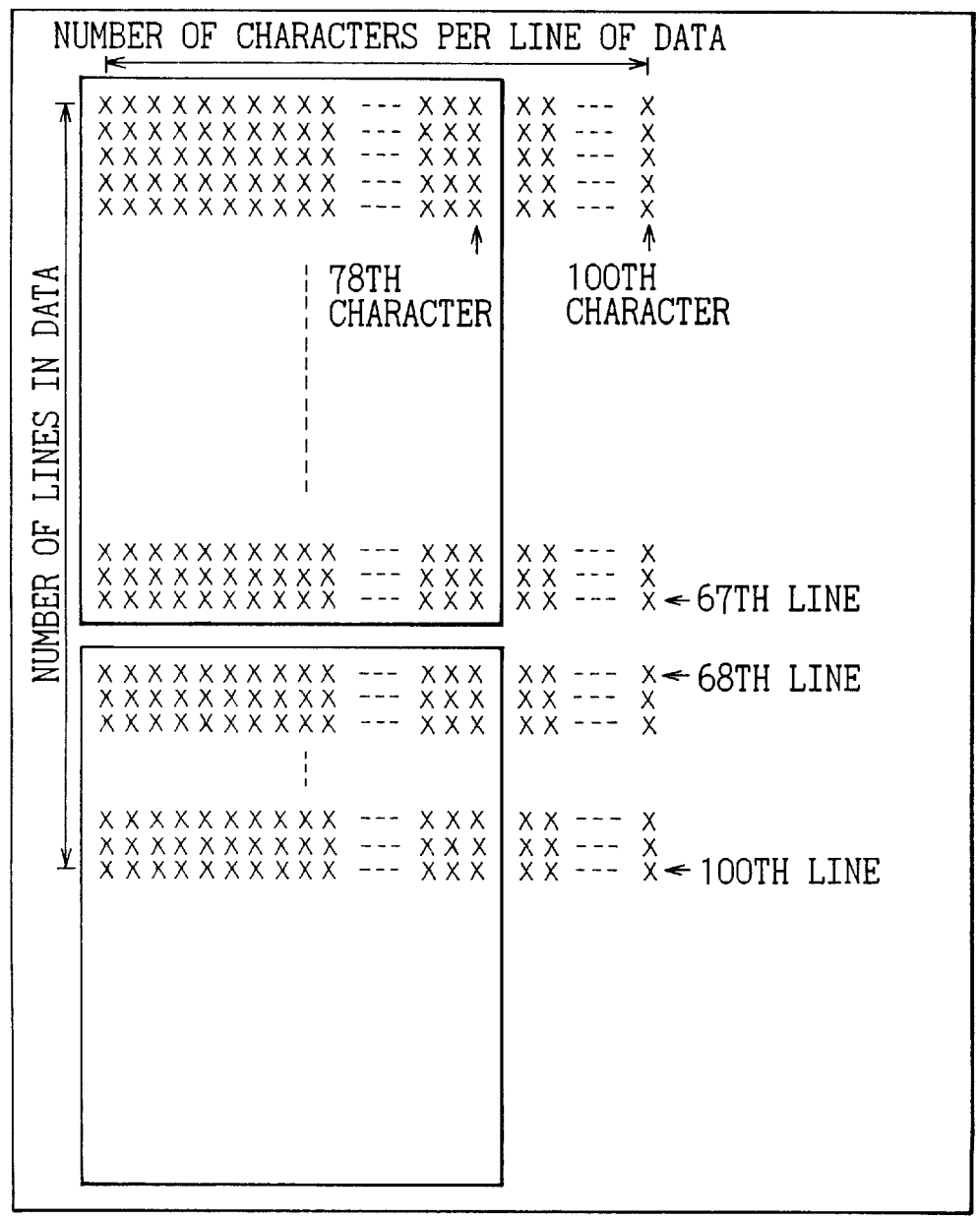
FIG. 7 is a diagram showing an example of printing.
Figure 8:
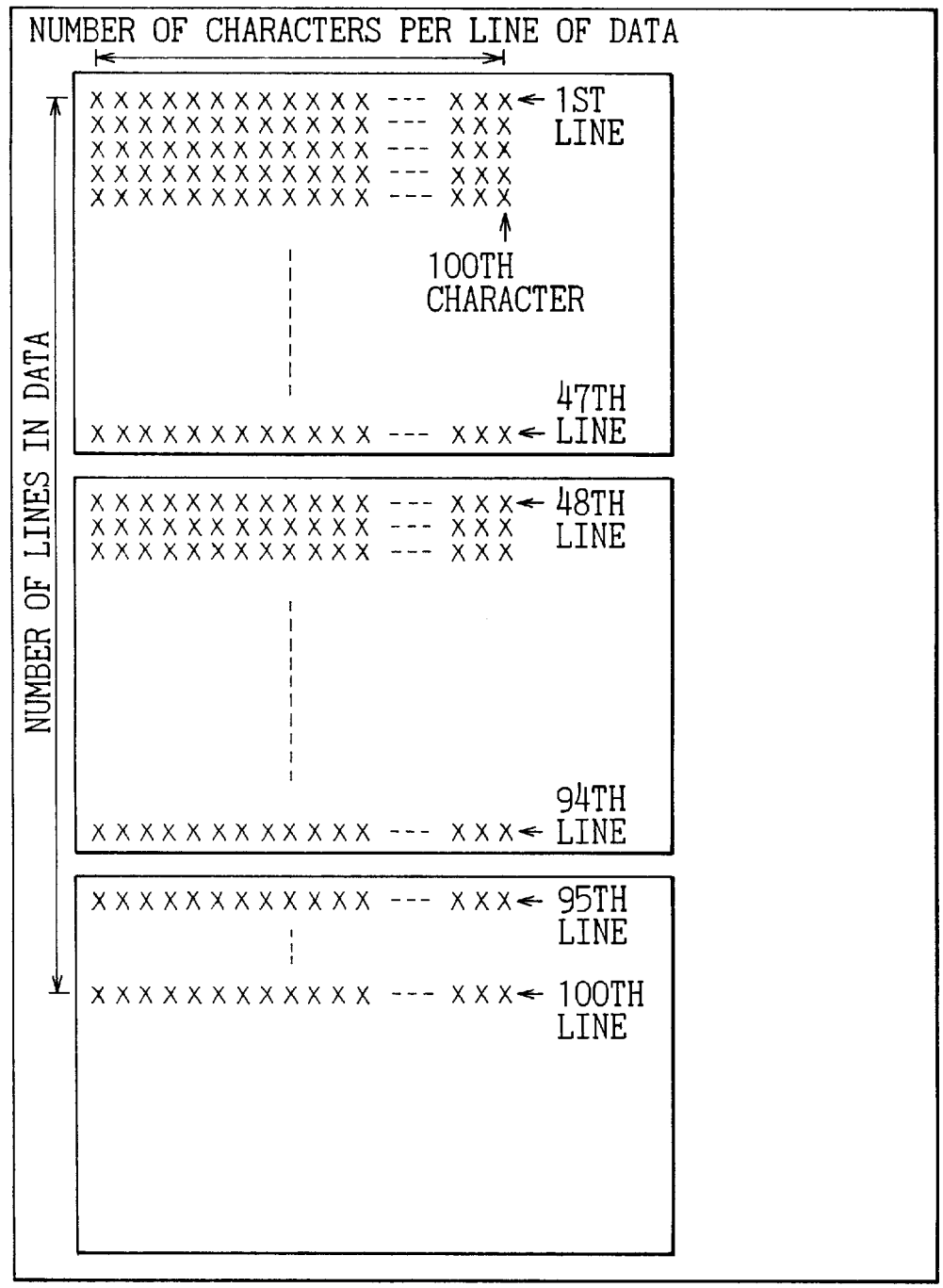
FIG. 8 is a diagram showing another example of printing.

Referring to FIGS. 7 and 8, a description will be given below of how the print results change by changing the printer driver information, while giving examples of the form data, the printer driver information, the information concerning the printing at the host terminal printer emulator, and the information output from the printer driver.

It is assumed here that the form data is print data with 100 lines and 100 characters per line, that the printer driver information specifies the paper size A4 (print area of 7.87 inches×11.29 inches) with portrait print orientation, and that the information concerning the printing at the host terminal printer emulator indicates line spacing of 6 lines per inch and character spacing of 10 characters per inch.

With the above assumption, if the printing is done in accordance with the information output from the printer driver, the print results shown in FIG. 7 will be obtained. That is, on the paper, up to 78 characters are printed per line, and the remaining 22 characters are discarded. Further, on the first page, 67 lines are printed, and the subsequent lines starting with the 68th line are printed on the second page. The portions enclosed by the solid lines in FIG. 7 are actually printed or presented on the preview screen.

Now, assume that the printer driver information is changed to specify the paper size A4 (print area of 11.29 inches×7.87 inches) with landscape print orientation, while leaving the form data and the information concerning the printing at the host terminal printer emulator intact.

With the above assumption, if the printing is done in accordance with the information output from the printer driver, the print results shown in FIG. 8 will be obtained. That is, on the paper, up to 100 characters are printed per line, and no characters are discarded. Further, the first to 47th lines are printed on the first page, the 48th to 94th lines on the second page, and the 95th to 100th lines on the third page. The portions enclosed by the solid lines in FIG. 8 are actually printed or presented on the preview screen.

As is apparent from the above description, the present invention offers significant advantages as described below.

(a) Paper wastage is reduced because of reduced possibility of print errors.

(b) No strain is imposed on communication traffic since the processing serves to reduce the number of times the printer driver is loaded.

(c) Paper size can be changed for each form even when printing continuous-form paper using a standard printer driver.

(d) Partial printing is easy because the printed page count matches between the host computer and the host terminal printer emulator.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A computer system comprising:
   terminal equipment having a host terminal printer emulator and a printer driver;
   a host computer comprising;
      a printing processing section carrying out processing to cause the terminal equipment to perform printing,
      a preview processing section;
         emulating an operating system running at the host terminal printer emulator side and enabling the printer driver to be run on the host computer,
         loading the printer driver from the host terminal printer emulator side, and
         creating a print preview of material to be printed at the terminal equipment side, and
      a print setting storing section; and
   a communication line connecting the host computer and the terminal equipment.

2. A computer system as claimed in claim 1, wherein the preview processing section queries the host terminal printer emulator about an identifier of the printer driver currently being used, examines whether the printer driver is already loaded, and loads the printer driver from the terminal equipment if the printer driver is not loaded yet.

3. A computer system as claimed in claim 1, wherein the print setting storing section stores print settings at the time a desired print preview is obtained.

4. A computer system as claimed in claim 1, wherein:

the print setting storing section stores a plurality of host terminal printer emulator and/or printer driver print settings; and the printing processing section selects print settings from among the print settings stored in the print setting storing section and downloads the selected print settings to the host terminal printer emulator.

5. A computer system as claimed in claim 1, wherein:

the preview processing section emulates a plurality of host terminal printer emulator operating systems;

the print setting storing section holds therein a plurality of host terminal printer emulator and/or printer driver print settings; and the printing processing section queries the host terminal printer emulator about the print settings of the host terminal printer emulator and/or the printer driver and, if the print settings obtained as the result of the querying are not appropriate, selects print settings from among the print settings stored in the print setting storing section and downloads the selected print settings to the host terminal printer emulator.

6. A computer system as claimed in claim 1, wherein print settings for the host terminal printer emulator and/or the printer driver are included in form data to be sent from the host computer to the host terminal printer emulator.

7. A method of previewing on a host computer a material to be printed at terminal equipment having a host terminal printer emulator and a printer driver, said method comprising:

emulating an operating system at the host terminal printer emulator side, and thereby enabling the printer driver to be run on the host computer;

loading the printer driver from the host terminal printer emulator side; and creating, by using the loaded printer driver, a print preview of material to be printed at the terminal equipment side.

8. A recording medium readable by a host computer for previewing a material to be printed at terminal equipment having a host terminal printer emulator and a printer driver, said recording medium storing a program for implementing:

an emulation facility emulating an operating system at the host terminal printer emulator side, and thereby enabling the printer driver to be run on the host computer;

a loading facility loading the printer driver from the host terminal printer emulator side; and a creation facility creating, by using the loaded printer driver, a print preview of a material to be printed at the terminal equipment side.

9. A host computer carrying out data communications via a communication line with terminal equipment having a host terminal printer emulator and a printer driver, comprising:

a unit emulating an operating system at the host terminal printer emulator side in order to enable the printer driver to be run on the host computer;

a unit loading the printer driver from the host terminal printer emulator side;

a unit previewing a material to be printed at the terminal equipment by using the loaded printer driver; and a unit downloading, to the host terminal printer emulator side, print settings at the time a desired print preview is obtained.

10. A method of processing in a host computer carrying out data communication via a communication line with terminal equipment having a host terminal printer emulator and a printer driver, said method comprising:

emulating an operating system at the host terminal printer emulator side in order to enable the printer driver to be run on the host computer;

loading the printer driver from the host terminal printer emulator side;

previewing a material to be printed at the terminal equipment by using the loaded printer driver; and downloading, to the host terminal printer emulator side, print settings at the time a desired print preview is obtained.

11. A recording medium readable by a host computer carrying out data communication via a communication line with terminal equipment having a host terminal printer emulator and a printer driver, said recording medium storing a program for implementing:

a facility emulating an operation system at the host terminal printer emulator side in order to enable the printer driver to be run on the host computer;

a facility loading the printer driver from the host terminal printer emulator side;

a facility previewing a material to be printed at the terminal equipment by using the loaded printer driver; and a facility downloading, to the host terminal printer emulator side, print settings at the time a desired print preview is obtained.

12. A terminal equipment, having a host terminal printer emulator and a printer driver, carrying out data communication via a communication line with a host computer, comprising:

a unit sending, to the host computer, current print settings contained in the host terminal printer emulator and the printer driver;

a unit uploading a printer driver file to the host computer; and a unit changing current print settings upon receiving a printer driver information change request as a result of a print preview processing in the host computer.

13. A method of processing in terminal equipment having a host terminal printer emulator and a printer driver, and carrying out data communication via a communication line with a host computer, said method comprising:

sending, to the host computer, current print settings contained in the host terminal printer emulator and the printer driver;

uploading a printer driver file to the host computer; and changing the current print settings upon receiving a printer driver information change request as a result of a print preview processing in the host computer.

14. A recording medium readable by terminal equipment having a host terminal printer emulator and a printer driver, and carrying out data communication via a communication line with a host computer, said recording medium storing a program for implementing:

a facility sending, to the host computer, current print settings contained in the host terminal printer emulator and the printer driver;

a facility uploading a printer driver file to the host computer; and a facility changing the current print settings upon receiving a printer driver information change request as a result of a print preview processing in the host computer.

15. A recording medium readable by a host computer for previewing a material to be printed at terminal equipment, having a host terminal printer emulator and a printer driver, by:

emulating an operating system at the host terminal printer emulator side, and thereby enabling the printer driver to be run on the host computer;

loading the printer driver from the host terminal printer emulator side; and creating, by using the loaded printer driver, a print preview of a material to be printed at the terminal equipment side.

16. A recording medium readable by a host computer carrying out data communication via a communication line with terminal equipment having a host terminal printer emulator and a printer driver, by:

emulating an operation system at the host terminal printer emulator side in order to enable the printer driver to be run on the host computer;

loading the printer driver from the host terminal printer emulator side;

previewing a material to be printed at the terminal equipment by using the loaded printer driver; and downloading, to the host terminal printer emulator side, print settings at the time a desired print preview is obtained.

17. A recording medium readable by terminal equipment, having a host terminal printer emulator and a printer driver, carrying out data communication via a communication line with a host computer by:

sending, to the host computer, print settings that the host terminal printer emulator and the printer driver have;

uploading a printer driver file to the host computer; and changing the print settings upon receiving a printer driver information change request as a result of a print preview processing in the host computer.

* * * * *